United States Patent [19]

Zegel

[11] 4,142,305
[45] Mar. 6, 1979

[54] TEACHING AID FOR ACCOUNTING

[76] Inventor: Snyder M. Zegel, 108 Monell Ave., Islip, N.Y. 11751

[21] Appl. No.: 797,064

[22] Filed: May 16, 1977

[51] Int. Cl.² ............................................. G09B 19/18
[52] U.S. Cl. .................... 35/24 R; 35/22 A; 273/1 R
[58] Field of Search .............. 35/24 R, 24 A, 24 B, 35/24 C, 22 A; 273/1 R

[56] References Cited

U.S. PATENT DOCUMENTS

| | | | |
|---|---|---|---|
| 1,234,743 | 7/1917 | Ellis | 35/24 A |
| 1,415,278 | 5/1922 | Tod | 35/24 C |
| 1,611,274 | 12/1926 | Larson | 35/24 A |
| 3,235,263 | 2/1966 | Smith | 35/22 A X |
| 3,889,395 | 6/1975 | Zegel | 35/24 R |

*Primary Examiner*—William H. Grieb
*Attorney, Agent, or Firm*—Salvatore A. Alamia

[57] ABSTRACT

A teaching aid for accounting comprising a flat rectangular bookkeeping entry guide bearing accounting indicia. A plurality of chips are provided, shaped to fit into recesses in the entry guide. A plurality of account cards are also provided, along with labels for each card. The account cards also have recesses shaped to receive the entry chips.

3 Claims, 14 Drawing Figures

ASSETS  CLAIMS

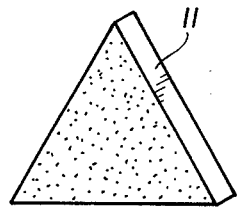
FIG. 4(a)
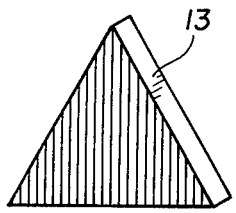
FIG. 4(b)
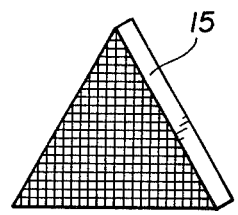
FIG. 4(c)
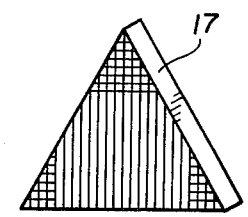
FIG. 4(d)
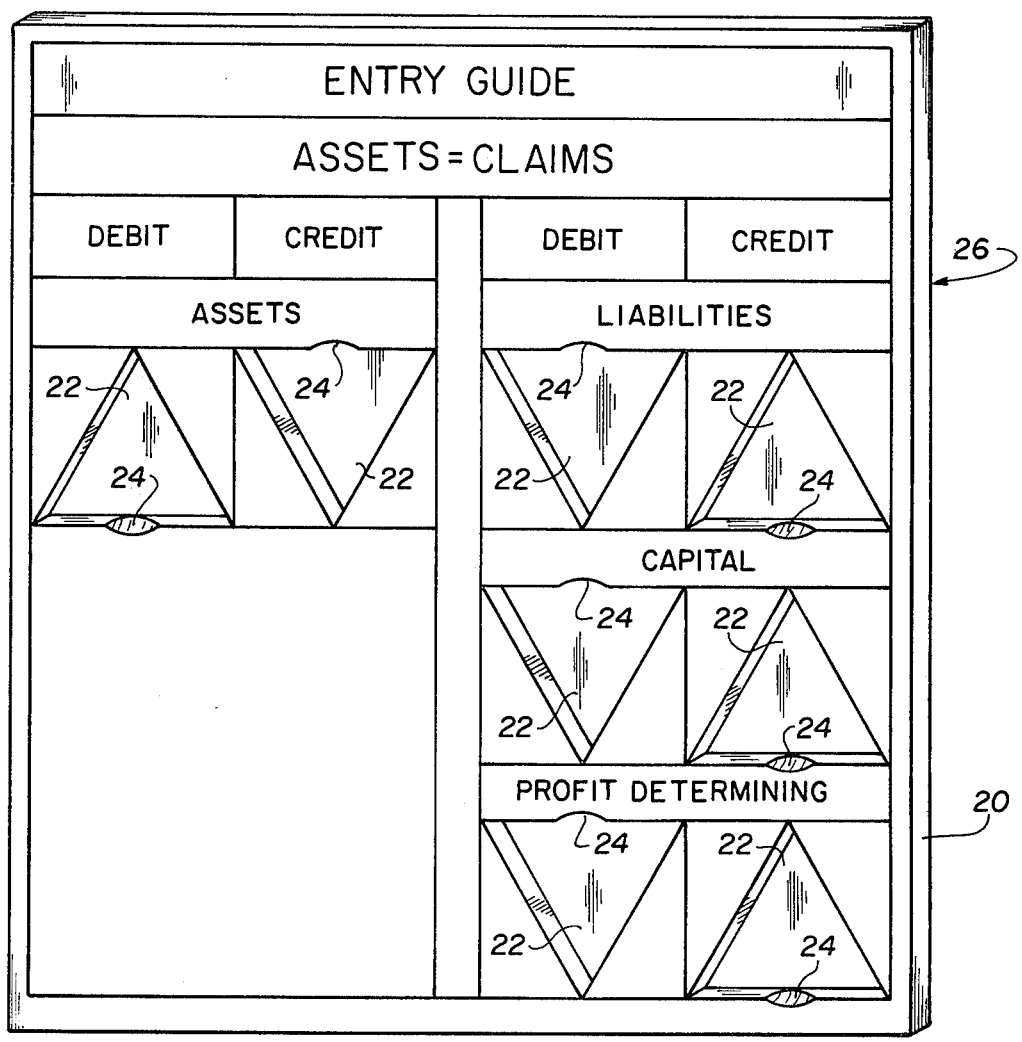

TEACHING AID FOR ACCOUNTING

This invention relates generally to a teaching aid and more particularly to a novel educational device useful as an aid in teaching the rudimentary principles of accounting. The current methods of teaching the double entry system of bookkeeping involve long and detailed formal study. Such methods may be appropriate for those who desire a career in accounting. However, with the increasing complexities in the day to day operations of most businesses, there exists the need for some teaching aid or educational device which is useful as an aid in teaching the rudimentary principles of double entry accounting for the non-professional.

The fundamental accounting equation for any business entity, stated in its simplest terms, is that its ASSETS equal its CLAIMS. All forms of property owned by a business entity and to which one can ascribe a money value are called assets. Since credit now plays an important role in business and since credit is often extended to enable a business entity to acquire assets, the law extents to creditors a "primary" claim on the assets. The proprietorship of the business entity may then be viewed as having a "secondary" claim on the assets, i.e. a claim on the assets limited to that left after the "primary" claims have been satisfied.

In accounting, the primary claims are called liabilities and the secondary claims are called equity or capital. Stated in other words, equity or capital is a representation of the net worth of a business entity, measured by the value of the assets less the value of the liabilities. Consequently, the fundamental equation may be expanded to: ASSETS equal LIABILITIES plus CAPITAL.

Generally, it is an object of the present invention to provide a novel teaching aid for simply and effectively demonstrating the rudimentary principles of double-entry accounting.

Specifically, it is an object of the present invention to provide a novel, game-like teaching device for illustrating the inter-relationship of assets, liabilities and capital and the several accounts that may exist under each category.

It is a further object of the present invention to provide a novel bookkeeping entry guide device and account cards to visually demonstrate the inter-relationship of assets and claims and the correctness of each accounting entry.

The above and other objects of the present invention are accomplished by a novel educational device comprising a bookkeeping entry guide device and a plurality of entry chips.

While the specification concludes with claims particularly pointing out and distinctly claiming the subject matter of the present invention, the presently preferred embodiments of the invention are described in the following detailed description taken in conjunction with the accompanying drawing in which:

FIG. 1 is a graphic representation of the fundamental accounting equation.

FIGS. 2(a) – 2(b) show both sides of an Asset entry chip.

FIGS. 2(c) – 2(d) show both sides of a Claims entry chip.

FIG. 3 illustrates a bookkeeping entry guide.

FIGS. 4(a) – 4(b) – 4(c) – 4(d) show arrowhead shaped entry chips.

FIG. 5 illustrates the bookkeeping entry guide of a second embodiment.

Figure 1:
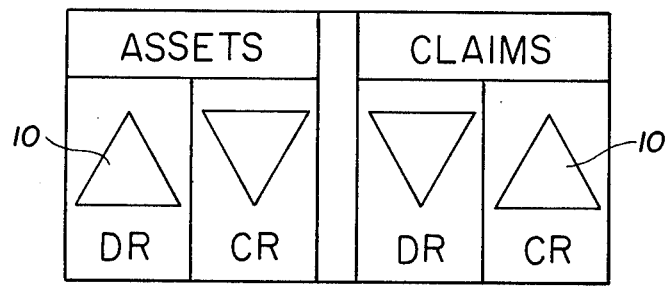

With reference to the drawing, FIG. 1 illustrates a graphic representation of the fundamental accounting equation: Assets equal Claims. It is noted that the arrowhead 10 demonstrates that an increase in Assets would be posted on the debit side of the asset account and an increase in Claims would be posted on the credit side of the claims account. Similarly, the remaining arrowheads indicate the posting of decreases in Assets or Claims.

This graphic representation of the fundamental accounting equation utilizing arrowheads is reproduced on the bookkeeping entry guide 16, in a manner fully described below, to assist the student in understanding how each side of the equation is to be debited or credited.

Figures 2A, 2B, 2C, 2D:
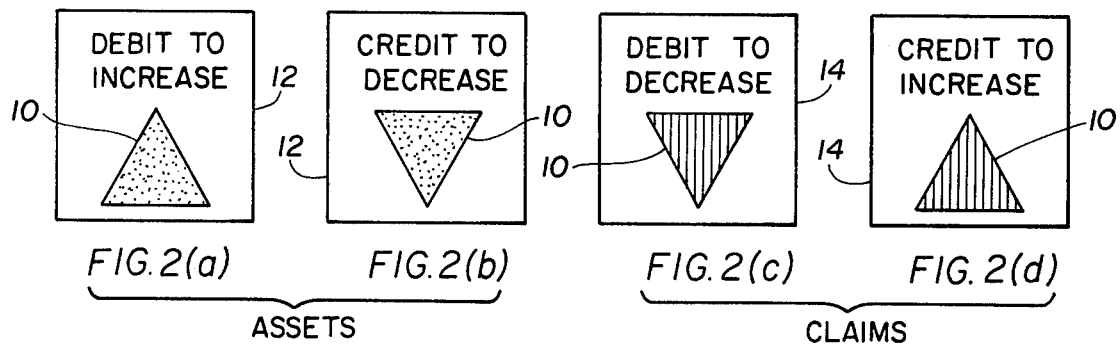

The present invention contemplates the use of a plurality of novel entry chips 12, 14 in conjunction with a novel bookkeeping entry guide 16. The debit side of an asset entry chip 12 is illustrated in FIG. 2(a) while the credit side of said chip 12 is shown in FIG. 2(b). Each side has an arrowhead 10 oriented to visually demonstrate that the student debits to increase and credits to decrease an asset. Similarly, each claim entry chip 14 has a debit side, FIG. 2(c), and a credit side, FIG. 2(d), bearing an arrowhead 10 oriented to visually demonstrate that the student debits to decrease and credits to increase a claim.

Figure 3:
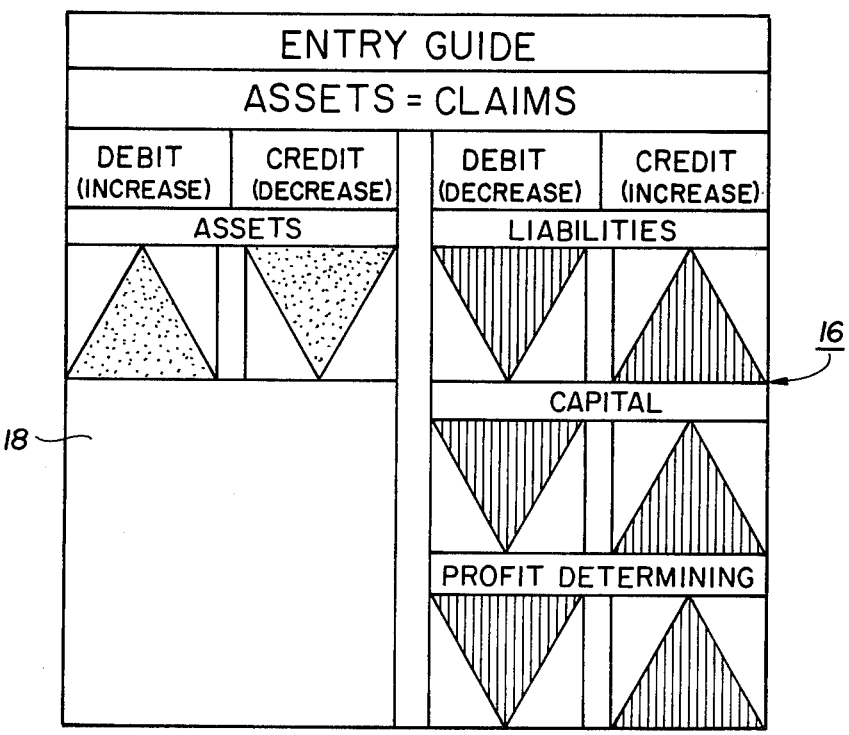

The novel bookkeeping entry guide 16 of the present invention is illustrated in FIG. 3. The face of a flat rectangular body 18 is divided into a left or asset side and a right or claims side in a fashion similar to the graphic representation of the fundamental accounting equation illustrated in FIG. 1. The asset side is further divided into the conventional debit and credit columns. Each column bearing an arrowhead symbol 10 as a further aid to the student in understanding debits versus credits in relation to increasing or decreasing an asset. Similarly, the claim side is divided into the conventional debit and credit columns. The three general categories of claims, i.e. liabilities, capital and profit determining, are set forth one below the other with each category having a pair of arrowhead symbols 10. One arrowhead symbol 10 of each pair is in the debit column while the other of each pair is in the credit column. Each arrowhead symbol 10 is oriented to aid the student in understanding debits versus credits in relation to increasing or decreasing a claim.

As a further aid to the student, although not essential to the present invention, the arrowheads appearing on the asset chips 12 and on the Asset side of the entry guide 16 are colored or filled-in in a manner clearly distinguished from that for claims indicating arrowheads.

In a second embodiment of the present invention, the entry chips are constructed in the shape of arrowheads, see FIGS. 4(a) through 4(d). The arrowhead shaped entry chip 11 may be colored or filled-in to represent an asset; the chip 13 of FIG. 4(b) represents a liability and is colored or filled-in in a manner distinguishing it from chip 11. The arrowhead shaped entry chip 15 represents capital and entry chip 17 represents a profit determining entry. The color coding or other distinguishing marks are employed to assist the student in readily indentifing the type of transaction involved and the various accounts that may exist under each category of Assets and Claims. However, such coding techniques are not essential to the present invention. They are but a matter of design and instructional facility.

The arrowhead shaped entry chips of FIGS. 4(a) through 4(d) may be used in conjunction with entry guide 16, as an advanced step, or may be used in conjunction with the entry guide 26 shown in FIG. 5. The entry guide 26 comprises a flat rectangular body 20 having a plurality of triangular or arrowhead shaped recesses 22 adapted to receive the entry chips 11, 13, 15, 17 therein and thereby assist the student in effecting the proper account entries. Entry guide 26 is similar in construction to guide 16 with the exception that the arrowhead symbols 10 of guide 16 are replaced by the recesses 22. A notch 24 facilitates removal of an entry chip placed in recess 22. Once the student has employed the entry guide he is prepared to make the appropriate bookkeeping entry into the affected accounts.

Figure 6:
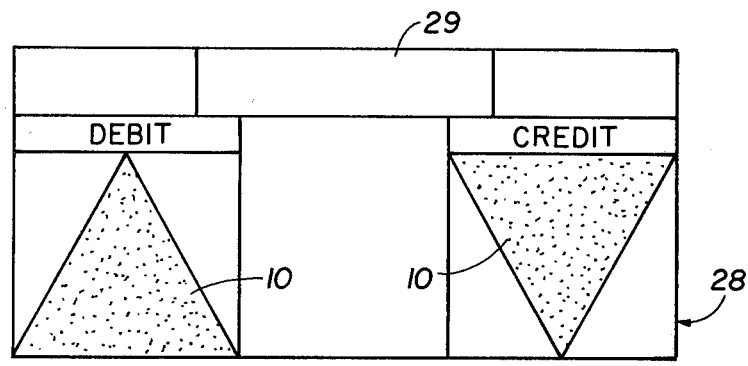
FIG. 6 illustrates an account card for an asset account.
Figure 7:
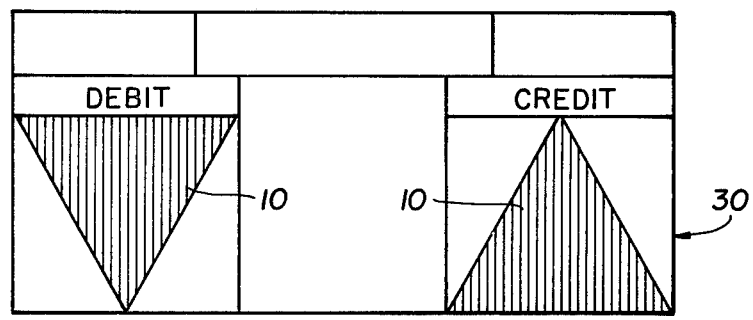
FIG. 7 shows an account card for a claims account.

FIG. 6 illustrates an account card 28 for an asset account. An arrowhead symbol 10 is provided on the debit side and on the credit side of the account card 28 to aid the student in understanding that you debit to increase an asset and credit to decrease same. An area 29 is provided at the top center of the account card 28 to allow for some label or other indicia of the identity of the account. An account card 30 for a claims account is shown in FIG. 7. Arrowhead symbols 10 are similarly provided on the face of card 30 to illustrate that you credit to increase a claim and debit to decrease same. In all other respects the claims account card 30 is identical in construction to the asset account card 28. It is contemplated that the accummulated totals for debits and credits on each card will be recorded on either the face, above the appropriate symbol, or reverse side of each account card.

Figure 8:
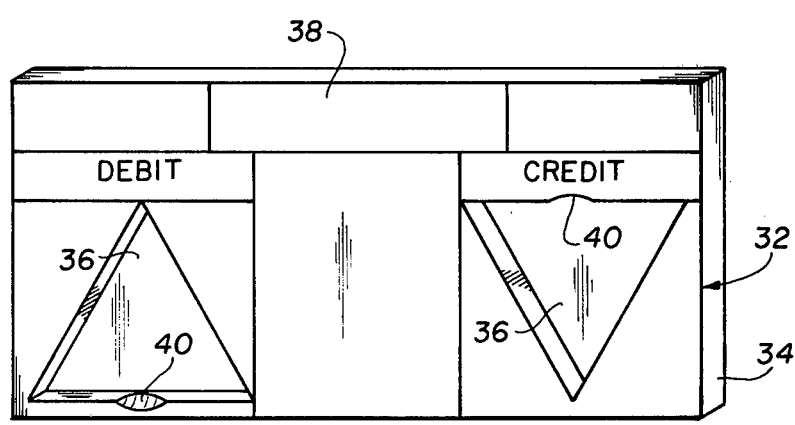
FIG. 8 illustrates an asset account card of a second embodiment of the present invention.

The account card 32 illustrated in FIG. 8 comprises a flat rectangular body 34 having a pair of triangular or arrowhead shaped recesses 36 adapted to receive the flat triangular entry chips 11 therein. The orientation of the triangular recesses 36 readily identifies card 32 as one for an asset account. An area 38 is provided at the top center of card 32 to allow for some label or other indicia of the identity of the account. A notch 40 is provided in the side wall of each recess 36 to facilitate removal of any entry chip 11 placed therein.

The present invention contemplates the use of entry guide 16 with either entry chips 12, 14 or triangular entry chips 11, 13, 15 and 17. In like fashion the triangular entry chips may be used with either the account cards 28, 30 or with asset account card 32 or a claims account card of similar construction (not shown).

In accordance with the present invention, the entry guide functions in the fashion of a bookkeeping journal. In doubleentry bookkeeping, a journal is a book or record of original entry. A ledger is a book or array of accounts to which debits and credits are posted from the record of original entry. The present invention contemplates that the transaction would be first "entered" upon the "journal" or entry guide. Once the transaction has been completely and accurately "entered" by the appropriate positioning of entry chips upon the entry guide, the entry chips and the amounts represented thereby are thereafter "posted" to the appropriate accounts by the proper transfer of the entry chips to the appropriate account cards. The entry chips may bear a numeral representative of a dollar amount or figures may be written thereon by the student to represent the amount he is then dealing with and the account affected. In the latter case such writings may be removed or erased upon subsequent use of the entry chips.

The device of the present invention may be used as either a teaching aid or an educational game. As a teaching device, in the teacher-student environment, the invention enables an instructor to develop a commercial account through a set of facts and the student, using the components of the invention, must accurately balance the transactions of the business for some stated accounting period. As an educational game, the invention contemplates the inclusion of preestablished fact patterns for a variety of business entities. Each player is given a copy of a specific fact pattern and the object of the game is to quickly and accurately post all transactions, close-out and balance all appropriate accounts and develop a profit and loss picture for the business in question. The first player to accurately complete the bookkeeping assignment is the winner. Answer sheets are provided corresponding to each fact pattern so the players may compare their results with the correct postings and balances.

To illustrate the use of the present invention as a teaching aid, the following transactions of one John Doe, a parking lot proprietor, will be explained, posted and closed-out using the components of the present invention.

John Doe decided to buy a piece of land near the local railroad station to be used as a parking lot. First, he opened a bank account in the business name: John's Parking lot; and, deposited therein $24,000.00 to start his businee. Mr. Doe thereafter bought the land desired for $20,000.00 drawn from the business account. During the first quarter of business Mr. Doe had borrowed a total of $6,000.00 and had received $12,000.00 in parking fees. In addition, a total of $3,000.00 had been paid out in that period for various operating expenses including printing, advertising and interest on loans. A total of $4,000.00 of the amount borrowed was repaid during that period and Mr. Doe had withdrawn a total of $7,000.00 from the business.

After a review of the fact pattern, the student will select: two (2) asset account cards 28 and label one "Cash" & the other "Land"; and five (5) claims account cards 30 and label them "Capital", "Loans Payable", "Expenses", "Income" and "Profit & Loss".

The student will then commence to record the several transactions following the normal accounting technique of "entering" first in the journal (entry guide) and thereafter "posting" to the ledger (account cards). The first transaction to be recorded is the deposit of $24,000.00 to start the business. An asset chip is selected and marked with a "24" on its debit side to denote the amount in thousands. This chip is placed on the entry guide 16 and a claims chip is selected and marked with a "24" on its credit side. The claims chip is placed on the entry guide in the capital segment. The student checks to be sure the basic equation is satisfied and then proceeds to transfer or "post" the chips to the appropriate account cards. The asset chip to the Cash account and the claims chip to the Capital account.

All the remaining transactions will be recorded in the same fashion. To "enter" the purchase of land, the student will select an asset chip and mark it with a "20" on its debit side and place it on the appropriate debit representation for an asset on the entry guide. Another asset chip is selected and marked with a "20" on its credit side and similarly placed on the entry guide. The debiting asset chip is thereafter transferred to the Land account and the crediting asset chip is transferred to the Cash account. At this point it is evident that the Cash account will carry two entry chips; one on its debit side valued at "24" and one on its credit side valued at "20", thus representing a debit balance, i.e. an excess of debits over credits, of $4,000.00.

To record the borrowing of $6,000.00 the student will select an asset entry chip 12 and mark it with a "6" on its debit side the place it on the entry guide. A claims chip is marked with "6" on its credit side and placed on the entry guide in the liabilities segment. The asset chip is transferred to the Cash account card and positioned over the debit side of said account card and the claims chip is transferred to the Loans Payable account card.

The sudent must next record the $12,000.00 received in parking fees. An asset entry chip is selected and marked "12" on its debit side and placed on the entry guide 16 in its appropriate position. A claims or profit determining entry chip is marked "12" on its credit side and properly positioned on the entry guide in the profit determining segment. The asset chip is transferred to the Cash account card and positioned over the debit side thereof and the claims chip (i.e. profit determining chip) is transferred to the Income account card and positioned on the credit side.

In like manner, the entry guide assists the student in properly "posting" the $3,000.00 in expenses. A profit determining chip marked with a "3" on its debit side and an asset chip marked with a "3" on its credit side are appropriately positioned on the entry guide and thereafter "posted" to the affected accounts. The profit determining chip is transferred to the debit side of the Expense account card and the asset chip is transferred to the credit side of the Cash account.

In posting the repayment of $4,000.00 a claims or liability chip marked "4" is debited and an assets chip marked "4" is credited on the entry guide. These chips are thereafter "posted" to the Loans Payable and Cash account cards respectively. Finally, the student will record Mr. Doe's withdrawal of $7,000.00 during the period. The account affected are Capital and Cash. The procedure is identical to that set forth hereinabove in all the other recording steps.

Thus, all transactions for the period under study have been "posted". The student must now balance each account by recording the excess of either debits or credits. If the debits exceed the credits in a particular account, the difference is called a "debit balance". The reverse situation yields a "credit balance" for the particular account. If all entries were properly made, the total of the debit balances will equal the total of all credit balances. If this "trial balance" criteria is satisfied, the student will close-out the temporary accounts to determine profit or loss for the busines during the period under study.

In closing out a temporary account its balance must be brought to zero. Accordingly a profit determining chip marked "3" is debited on the Profit & Loss account card and a profit determining chip marked "3" is positioned on the credit side of the Expenses account card bringing the balance there to zero. Similarly, a profit determining chip marked "12" is placed on debit side of the Income account card bringing the balance of that account to zero and a profit determing chip marked "12" on its credit side is placed on credit side of the Profit & Loss account card. Under the facts of this example, as recorded, the Profit & Loss account card carries a credit balance of "9", i.e. the business showed a profit of $9,000.00 during the period.

Since the Profit and Loss summary account is similarly a temporary account, it too must be closed-out and its balance transferred to the permanent Capital account. Consequently, in the manner heretofore explained, Profit and Loss is debited "9" and Capital is credited "9". The student may now prepare a post-closing trial balance which should compare favorably with that held by the instructor.

The foregoing description is intended to be merely illustrative of presently preferred embodiments of the present invention within an exemplary environment. A latitude of modification, change and substitution is intended wherein some features of the invention will be employed without a corresponding use of other features so described herein. Accordingly, various modes of carrying out the invention are contemplated as being within the scope of the following claims.

I claim:

1. A teaching device useful as an aid in teaching the rudimentary principles of accounting comprising:
   a. a flat rectangular bookkeeping entry guide bearing accounting indicia thereon;
   b. a plurality of bookkeeping entry chips;
   c. a plurality of recesses on said entry guide shaped in congruity with said entry chips for receiving same;
   d. a plurality of account cards bearing accounting indicia thereon;
   e. means for labeling each account card; and,
   f. a plurality of recesses on said account cards shaped in congruity with said entry chips for receiving same.

2. A teaching device according to claim 1 wherein said entry chips and said recesses are triangular in shape.

3. A teaching device according to claim 2 wherein said triangular shaped recesses are oriented upwards to represent an increase in assets or claims and downwards to represent a decrease in assets or claims thereby assisting the student in making appropriate placements of entry chips upon said entry guide and thereafter upon particular account cards.

* * * * *